No. 894,874. PATENTED AUG. 4, 1908.
A. V. BRYCE.
LOCKING NUT.
APPLICATION FILED SEPT. 16, 1907.
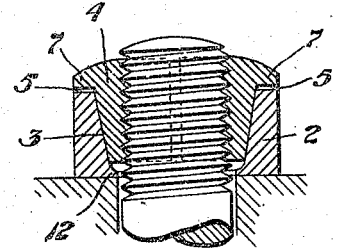
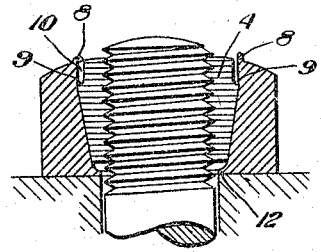
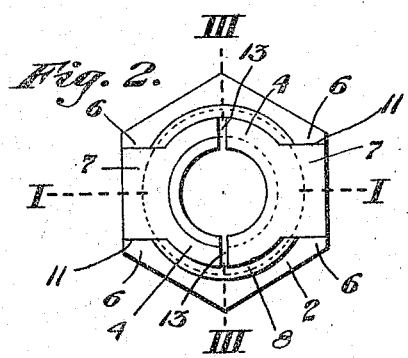
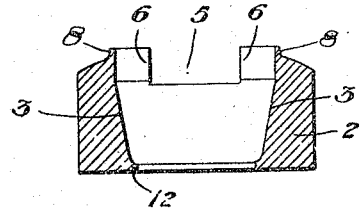
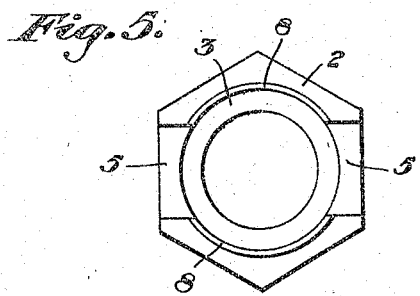
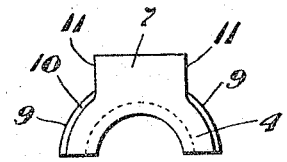
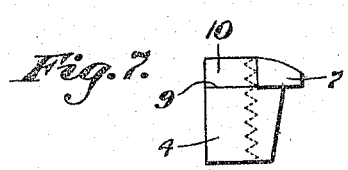
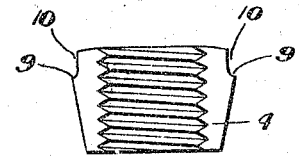
Witnesses:
Chas. S. Epley.
Fred Staub.
Inventor:
Andrew V. Bryce
by C. M. Clarke
his Attorney

UNITED STATES PATENT OFFICE.

ANDREW V. BRYCE, OF PITTSBURG, PENNSYLVANIA, ASSIGNOR TO INTER-STATE MANUFACTURING COMPANY, OF PITTSBURG, PENNSYLVANIA, A CORPORATION OF ARIZONA TERRITORY.

LOCKING-NUT.

No. 894,874.      Specification of Letters Patent.      Patented Aug. 4, 1908.

Application filed September 16, 1907. Serial No. 393,071.

*To all whom it may concern:*

Be it known that I, ANDREW V. BRYCE, a citizen of the United States, residing at Pittsburg, in the county of Allegheny and State of Pennsylvania, have invented certain new and useful Improvements in Locking - Nuts, of which the following is a specification, reference being had therein to the accompanying drawing.

My invention consists in improvements in locking nuts for bolts etc. of that class wherein a turning nut is provided with separable internally threaded tapered bushings adapted to engage the bolt under turning action of the nut and to gradually tighten upon it so as to prevent loosening.

The invention has for its object to provide a device of its character which shall be simple and efficient in construction, cheap to manufacture, so constructed that the nut and the contained separate bushings may be assembled and maintained in operative relation to each other without separation during shipment or handling, and generally adapted to tightly hold the bolt without danger of loosening, as shall be more fully hereinafter described.

Referring to the drawings: Figure 1 is a vertical sectional view showing the device secured upon the end of a threaded bolt, indicated by the section line I. I. of Fig. 2. Fig. 2 is a plan view of Fig. 1. Fig. 3 is a sectional view similar to Fig. 1 at right angles thereto, indicated by the section line III. III. of Fig. 2. Fig. 4 is a sectional detail view of the outer nut detached. Fig. 5 is a plan view of the outer nut with the bushings removed. Figs. 6 7 and 8 are detail views of one of the bushings detached.

2 is a turning nut of any suitable form, either square or hexagon, the middle interior portion of which is provided with downwardly narrowing tapered walls 3 as shown in Figs. 1, 3 and 4, adapted to receive the separate interior bushings 4 as shown in the sectional views.

The upper face of nut 2 is provided with oppositely arranged recesses 5 cut or formed in any suitable manner below the general upper surface of the nut and adapted to receive and engage by the shoulders 6, 6, the laterally projecting lug 7 of each separate bushing, at opposite sides as clearly shown. The deeper un-recessed portions of the nut 2 extend upwardly for the full depth at each side between recesses 5, as clearly shown in Fig. 4 and the tapered interior wall 3 of the nut is deflected into an internal vertical wall which extends upwardly to the top and is provided with a bent over lip or fin 8, adapted to be bent over to engage a shoulder 9 of each bushing 4 when inserted, the bushings preferably having annular recesses 10 for clearance. The bushings preferably make a neat fit within and against their receiving walls with sufficient friction to prevent separation by ordinary handling, whereby the parts are maintained in assembled relation to each other, while the sides 11 of lugs 7 also fit neatly within and against shoulders 6, for the same purpose.

The annular inclined interior wall 3 of the nut preferably terminates in an annular shoulder 12 at the base of the nut whereby to prevent undue downward travel of the bushing and gives a finished lower surface to the nut. The bushings may be made in any suitable manner, as by casting, with which method I have secured good results in practice, care being taken that the threads of the bushings are so arranged as to aline with each other at their terminals, for which purpose I make the bushings from different patterns so that when seated in the nut 2 their threads will form practically one continuous thread, being interrupted at opposite sides only by the slight intervening space 13, as clearly shown in Fig. 2. The function of such space is that as the nut 2 is screwed around upon its seat, and further motion being imparted to the bushings, they will be fed downwardly upon the bolt by its threads and will be drawn inwardly by reason of the tapered faces 3, and the corresponding tapered faces around the semi-circular exterior of each bushing 4. It will be understood of course that the degree of taper in the nut and bushings is preferably the same to insure a good bearing throughout the entire length of the bushings. When thus assembled and applied, the nut may be screwed down until it has been turned to the desired tension whereupon the bushings will firmly grasp the bolt, and at the same time hold the nut in its seated position. As thus assembled the complete device will act to securely hold any parts of mechanism to which it is applied, by means of the bolt, and disengagement or loosening will be absolutely prevented. Should, for any reason, the parts become loose, as by lengthening of the bolt, or from other causes, the device may be readily adjusted by merely turning the nut to take up wear.

As thus constructed the complete device constitutes a strong, efficient and durable locking nut having great strength and continuous holding power. It may be used in various adaptations and may be changed or varied in different details of construction or design or in other features by the skilled mechanic, but all such changes are to be considered as within the scope of the following claims.

What I claim is:

1. A locking nut comprising an outer interiorly tapered portion and a plurality of inner bushings with corresponding outer tapered faces and interior threads, said outer portions having inwardly bent lips for holding the parts in engagement with each other, substantially as set forth.

2. A locking nut consisting of an outer nut having an interior tapered cavity and oppositely arranged recesses and intervening annular extensions terminating in shoulders and provided with thin retaining lips, and a plurality of bushings having corresponding exterior tapered faces and interior threads and laterally extending top abutments adapted to seat in said recesses with intervening annular portions adapted to be engaged by the retaining lips when bent over, substantially as set forth.

3. In a locking nut, the combination of an outer nut having an interior tapered cavity at its middle portion and provided at one end with oppositely arranged recesses between embracing shoulders and annularly arranged thin projecting lips extending between said shoulders; and a bushing having correspondingly tapered exterior faces and interior threads, provided at one end with laterally arranged abutments adapted to seat in said recesses, with intervening annularly arranged clearance spaces for making locking engagement with said annularly arranged projecting lips of the outer nut, substantially as set forth.

4. In a locking nut, the combination of an outer nut having an interior tapered cavity at its middle portion and provided at one end with oppositely arranged recesses between embracing shoulders and annularly arranged thin projecting lips extending between said shoulders; and a plurality of bushings having correspondingly tapered exterior faces and interior threads, provided at one end with laterally arranged abutments adapted to seat in said recesses, with intervening annularly arranged clearance spaces for making locking engagement with said annularly arranged projecting lips of the outer nut, substantially as set forth.

5. In a device of the class described, a generally semi-cylindrical bushing having a semi-circular base portion bounded by a smooth, tapered wall, recessed at opposite sides to provide clearance and shoulders for the locking device, and having a laterally extending locking lug at one side of its top, the opposite face of the bushing at each side of the intervening semi-cylindrical threaded cavity being flat, substantially as set forth.

In testimony whereof I affix my signature in presence of two witnesses.

ANDREW V. BRYCE.

Witnesses:
GEO. B. BLEMING,
C. M. CLARKE.